(12) United States Patent
Li et al.

(10) Patent No.: US 9,069,170 B1
(45) Date of Patent: Jun. 30, 2015

(54) ULTRAVIOLET LASER ZOOM BEAM EXPANDING SYSTEM AND LASER PROCESSING EQUIPMENT

(71) Applicants: HAN'S LASER TECHNOLOGY INDUSTRY GROUP CO., LTD., Shenzhen, Guangdong (CN); HAN'S CNC SCIENCE AND TECHNOLOGY CO., LTD, Shenzhen, Guangdong (CN)

(72) Inventors: Jiaying Li, Guangdong (CN); Chaoming Zhou, Guangdong (CN); Bo Sun, Guangdong (CN); Yuqing Chen, Guangdong (CN); Yunfeng Gao, Guangdong (CN)

(73) Assignees: HAN'S LASER TECHNOLOGY INDUSTRY GROUP CO., LTD., Shenzhen (CN); HAN'S CNC SCIENCE AND TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 14/415,838

(22) PCT Filed: Jun. 24, 2013

(86) PCT No.: PCT/CN2013/077734
§ 371 (c)(1),
(2) Date: Jan. 20, 2015

(87) PCT Pub. No.: WO2014/012415
PCT Pub. Date: Jan. 23, 2014

(30) Foreign Application Priority Data

Jul. 18, 2012 (CN) .......................... 2012 1 0248607

(51) Int. Cl.
*G02B 13/14* (2006.01)
*G02B 27/09* (2006.01)

(52) U.S. Cl.
CPC ................... *G02B 27/0955* (2013.01)

(58) Field of Classification Search
CPC ............................ G02B 13/14; G02B 27/09
USPC ................ 250/504 R; 359/350, 354, 355
See application file for complete search history.

(56) References Cited

FOREIGN PATENT DOCUMENTS

| CN | 101414052 A | 4/2009 |
|---|---|---|
| CN | 101887173 A | 11/2010 |
| KR | 20100048092 A | 5/2010 |

OTHER PUBLICATIONS

International Search Report issued Oct. 10, 2013 in International Application No. PCT/CN2013/077734.

*Primary Examiner* — Michael Maskell
(74) *Attorney, Agent, or Firm* — Novak Druce Connolly Bove + Quigg LLP

(57) ABSTRACT

An ultraviolet laser zoom beam expanding system, applied to the field of laser processing, includes a first lens, a second lens, and a third lens (L1, L2, L3). The first lens and the third lens (L1, L3) are plane-convex plus lenses, and the second lens (L2) is a convex-concave minus lens. The first lens, the second lens and the third lens (L1, L2, L3) respectively comprise a first surface and a second surface (S1, S2), a third surface and a fourth surface (S3, S4) as well as a fifth surface and a sixth surface (S5, S6). The radiuses of curvature of the first to sixth surfaces (S1, S2, S3, S4, S5, S6) are ∞, −30, 10, 2.2, ∞, −81. The center thickness of the first to third lenses (L1, L2, L3) is 2, 1, 4. The outer diameters of the first to third lenses (L1, L2, L3) are 10, 3, 34. Proportions of the refractive indexes to the abbe numbers of the first to third lenses (L1, L2, L3) are 1.57:41, 1.48:68, and 1.57:41. An interval (d2) between the second surface and the third surface (S2, S3) is 6-37. An interval (d4) between the fourth surface and the fifth surface (S4, S5) is 114-125, a unit is mm, and a tolerance is 5%. The system may perform beam expanding on entering light by 2-16 times, which may be adaptable to laser devices with different emergent diameters and divergence angles, and improve efficiency and accuracy of laser processing.

10 Claims, 4 Drawing Sheets

ULTRAVIOLET LASER ZOOM BEAM EXPANDING SYSTEM AND LASER PROCESSING EQUIPMENT

RELATED APPLICATIONS

This application is a national stage application (under 35 U.S.C. §371) of PCT/CN2013/077734, filed Jun. 24, 2013, which claims benefit of Chinese Application No. 201210248607.2, filed Jul. 18, 2012, the contents of which are incorporated by reference herein in its entirety.

FIELD OF THE INVENTION

The present disclosure relates to the field of laser processing technology, and more particularly relates to an ultraviolet laser zoom beam expanding system and a laser processing equipment.

BACKGROUND OF THE INVENTION

In laser processing field, the emergent light diameter $\Phi$ of a laser beam is relative small (about 1 mm). If such narrow light beam is focused directly, a greater Rayleigh disk will be obtained. According to the Rayleigh disk formula: $\delta=2.44\lambda/D$, where $\delta$ represents a diameter of the Rayleigh disk, D represents an entrance pupil diameter, f represents a focal length, it can be inferred that, the smaller D, the greater $\delta$, the power on the focus point is weaker, thus greatly reducing a processing accuracy of the system. Therefore, a beam expander is always employed in an optical system employed for a laser processing to expand the narrow light beam emitted from a laser, which will be focused by a laser processing focus lens.

According to the Lagrange invariant theorem: $J=nD\theta=n'D'\theta'$, where n and n' respectively represent refraction indexes of mediums in object field and image field of the optical system, when mediums in the object side and the image side are both air, $n=n'=1$. D and D' respectively represent an entrance pupil diameter and an exit pupil diameter of the optical system. $\theta$ and $\theta'$ respectively represent field angles of an incident light and an emergent light, which can be represented in radians if they are too small. It can be inferred that, when $\theta$ is relative large, the light beam can be expanded by $\beta=D/D'$ times via the beam expander for subsequent laser processing.

During the processing, laser wavelengths $\lambda$ adapted for a variety of processing objects are different, such as $\lambda=1064$ nm, $\lambda=532$ nm, $\lambda=266$ nm, and so on, thus a variety of optical beam expanders adapted for lasers with different wavelengths appear. At the same time, it demands that the optical beam expander has a greater of the application range, i. e. a beam expander can accommodate different application environments, such as different exit pupil diameters, divergence angles of a laser. In addition, the optical beam expander is required to adapt to different laser processing focus lens to achieve an ideal coupling. Therefore, a zoom beam expander becomes a research focus in the field of laser processing. At present, the common magnification of the zoom beam expander is between 2× to 8×, which is too small to satisfy a demand of the laser processing. In the event when a greater zoom value is required, a beam expander with fixed magnification must be used, such that a requirement of multiple zoom values cannot be achieved by merely a single beam expander, which is inconvenience for laser processing and affects the efficiency of laser processing.

SUMMARY OF THE INVENTION

Technical Problem to be Solved

It is an object of the present invention is to provide an ultraviolet laser zoom beam expanding system to solve the problem of limited expanding capacity and narrow adaption of the conventional zoom beam expander.

Technical Solution

The present invention is achieved by the following solution. An ultraviolet laser zoom beam expanding system includes a first lens, a second lens, and a third lens, which are coaxially arranged along a transmission direction of an incident light in subsequence; the first lens and the third lens being plane-convex positive lenses, and the second lens being a meniscus negative lens;

wherein the first lens comprises a first surface and a second surface; the second lens comprises a third surface and a fourth surface; the third lens comprises a fifth surface and the sixth surface; the first to sixth surfaces are arranged sequentially along the transmission direction of the incident light;

radiuses of curvature of the first to sixth surfaces are ∞, −30 mm, 10 mm, 2.2 mm, ∞, −81 mm, respectively;

center thicknesses of the first to third lenses are 2 mm, 1 mm, 4 mm, respectively;

outer diameters of the first to third lenses are 10 mm, 3 mm, 34 mm; respectively;

ratios of refractive index to Abbe number of the first to third lenses are 1.57:41, 1.48:68, 1.57:41, respectively;

a distance on an optical axis between the second surface and the third surface ranges from 6 to 37 mm; a distance on the optical axis between the fourth surface and the fifth surface ranges from 114 to 125 mm.

Tolerances of the radius of curvature, the center thickness, the outer diameter, the ratio of the refractive index to Abbe number, and the distance are 5%.

It is another object of the present invention is to provide a laser processing equipment including an ultraviolet laser, an expanding system configured to expand a laser beam emitted by the ultraviolet laser, and a focusing lens configured to focus the expanded beam, and the expanding system is the ultraviolet laser zoom beam expanding system described above.

Advantageous Effects

By the configuration of the lenses of the expanding system, the ultraviolet laser beam is magnified by 2 to 16 times of the original, which is far beyond the magnification range of the conventional beam expander, such that the expanding system can be adapted to more ultraviolet lasers with various diameters and divergence angles of the emitted light, thus expanding the scope of use of the expanding system and improving the efficiency of the laser processing. Besides, since the maximum magnification of the system is greater than that of the convention beam expander, the shaping effect to the beam is better, and the focusing performance of the beam, as well as the accuracy of laser processing is effectively improved.

Since the expanding system has a greater magnification range and is highly adaptive, the laser processing equipment using the expanding system has an improved processing precision and a higher processing efficiency.

DETAILED DESCRIPTION OF THE EMBODIMENTS

These and other features of the present invention will become readily apparent upon further review of the following specification and drawings. The various embodiments of the invention may, however, be embodied in many different forms and should not be construed as limited to the embodiments set forth herein.

The following detailed description refers to the accompanying drawings that show, by way of illustration, specific details and embodiments in which the invention may be practiced.

Figure 1:
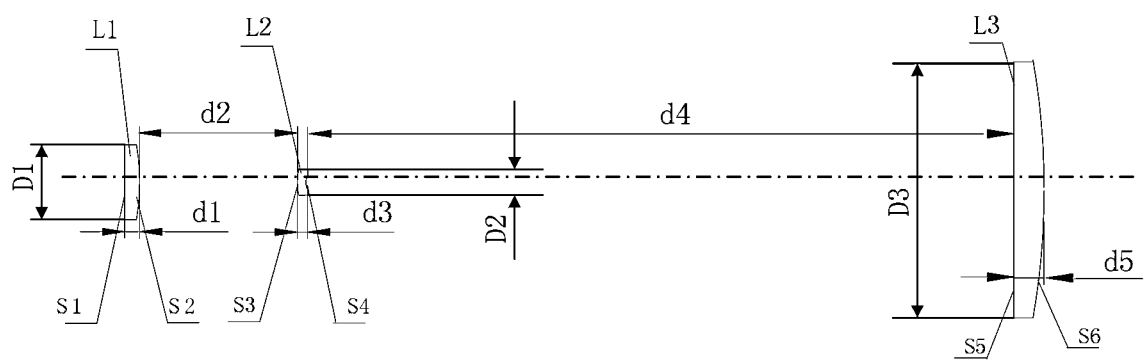
FIG. 1 is a cross-sectional view of an ultraviolet laser zoom beam expanding system according to an embodiment of the present invention.

FIG. 1 shows a cross-sectional view of an ultraviolet laser zoom beam expanding system according to an embodiment of the present invention. In order to facilitate illustration, FIG. 1 merely shows a portion of ultraviolet laser zoom beam expanding system related to the embodiment.

The ultraviolet laser zoom beam expanding system is mainly applied to ultraviolet light, especially the ultraviolet light with wave length of 355 nm. Referring to FIG. 1, the system includes a first lens L1, a second lens L2, and a third lens L3 which are sequentially coaxially arranged along a transmission direction of an incident light. The first lens L1 is a plane-convex positive lens, the second lens L2 is a meniscus negative lens, and the third lens L3 is a plane-convex positive lens. The first lens L1 includes a first surface S1 and a second surface S2 sequentially coaxially arranged along the transmission direction of the incident light, i.e. the first surface S1 and the second surface S2 serve as a light incident surface and a light emergent surface, respectively. Similarly, the second lens L2 includes a third surface S3 and a fourth surface S4, the third lens L3 includes a fifth surface S5 and a sixth surface S6. The incident light is transmitted along a direction from the first surface S1 to sixth surfaces S6, and expanded after going through the whole zoom beam expanding system.

In the system, the first surface S1 of the first lens L1 is a plane, a radius of curvature of the first surface S1 is ∞, the second surface S2 of the first lens L1 protrudes outwardly relative to the first surface S1, a radius of curvature of the second surface S2 is −30 mm. The minus indicates that a spherical center of the curved surface is located at the object side of the curved surface, the plus (in the embodiment, numeral value without minus represents a positive value) indicates that a spherical center of the curved surface is located at the image side of the curved surface, in the following description, above definition is applied to the numeral values throughout. Besides, a center thickness d1 of the first lens L1 (i.e. the thickness of the first lens L1 on the optical axis) is 2 mm, and an outer diameter D1 of the first lens L1 is 10 mm. A ratio of a refractive index Nd1 to an Abbe number Vd1 of the first lens L1 is 1.57:41. Each above described parameter is not the only option and has a tolerance range of 5%, i.e. each parameter of the second lens L2 can vary within ±5%.

The third surface S3 of the second lens L2 protrudes towards the object side, a radius of curvature of the third surface S3 is 10 mm; the fourth surface S4 also protrudes towards the object side, but is concave relative to the third surface S3, and a radius of curvature of the fourth surface S4 is 2.2 mm. A ratio of a refractive index Nd3 to an Abbe number Vd3 of the second lens L2 is 1.48:68, a center thickness d3 of the second lens L2 is 1 mm, and an outer diameter D2 of the second lens L2 is 3 mm. A tolerance range of each parameter of the second lens L2 is still 5%.

The fifth surface S5 of the third lens L3 is a plane, a radius of curvature of the fifth surface S5 is ∞; the sixth surface S6 protrudes outwardly relative to the fifth surface S5, a radius of curvature of the sixth surface S6 is −81 mm. A ratio of a refractive index Nd5 to an Abbe number Vd5 of the third lens L3 is 1.57:41, a center thickness d5 of the third lens L3 is 4 mm, and an outer diameter D3 of the third lens L3 is 34 mm. A tolerance range of each parameter of the second lens L2 is also 5%.

Furthermore, a distance between the first lens L1 and the second lens L2, and a distance between the second lens L2 and the third lens L3 are limited hereby. Specifically, a distance d2 on the optical axis between the light emergent surface (the second surface S2) of the first lens L1 and the light incident surface (the third surface S3) of the second lens L2 is 6 to 37 mm, a tolerance of the distance d2 is 5%; a distance d4 on the optical axis between the light emergent surface (the fourth surface S4) of the second lens L2 and the light incident surface (the fifth surface S5) of the third lens L3 is 114 to 125 mm, a tolerance of the distance d4 is 5%.

Above solution will be illustrated more clearly with the following table:

TABLE 1 configuration parameters of the ultraviolet laser zoom beam expanding system

| L (lens) | S (surface) | R (radius of curvature) | d (distance between surfaces) | d (center thickness) | Material (Nd/Vd) | D (outer diameter) |
|---|---|---|---|---|---|---|
| 1 | 1 | ∞ | | 2 | 1.57/41 | 10 |
|   | 2 | −30 | d2 | | | |
| 2 | 3 | 10 | | 1 | 1.48/68 | 3 |
|   | 4 | 2.2 | d4 | | | |
| 3 | 5 | ∞ | | 4 | 1.57/41 | 34 |
|   | 6 | −81 | | | | |

After each lens is configured according to above design parameters, the incident ultraviolet laser beam can be magnified by 2 to 16 times by the beam expanding system, the expanding range thereof is far beyond the magnification range of the conventional beam expander, such that the expanding system can be adapted to more lasers with different diameters and divergence angles, thus expanding the using scope of the expanding system and improving the efficiency of the laser processing. Besides, according to the Lagrange invariant theorem, when the beam is expanded, the divergence angle thereof will be decreased, and the maximum magnification of the system is greater than that of the conventional beam expander, which also makes the contraction effect of the light beam divergence angle superior to that of the light beam expanded by the conventional beam expanding lens, enabling the emergent light to obtain a higher degree of parallelism and a better focusing effect, and thus more conducive to subsequent shaping and focusing during the course of laser processing, improving the processing accuracy.

The system can be adapted to a laser with a divergence angle of ±2 to 4 millradian (i.e. the angle value of the divergence angle is 2 to 4 millradian). An entrance pupil diameter range of the laser is 2 to 8 mm, and an exit pupil diameter range thereof is up to 4 to 32 mm, an optical length can be controlled within 135 mm. For the ultraviolet laser beam with a largest exit diameter of 2 mm, the beam expanding system can expand the ultraviolet laser beam by 2 to 16 times; for the ultraviolet laser beam with a largest exit diameter of 8 mm, the beam expanding system can expand the ultraviolet laser beam by 2 to 4 times.

Figure 2:
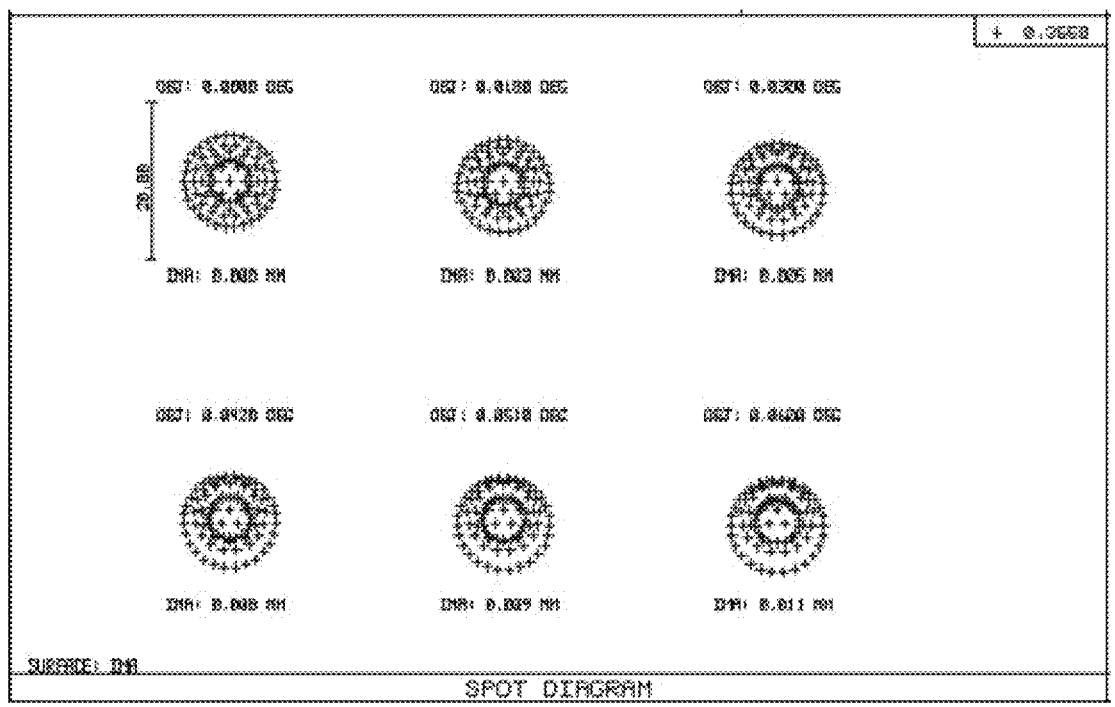
FIG. 2 is a spot diagram of the ultraviolet laser zoom beam expanding system according to an embodiment of the present invention.
Figure 3:
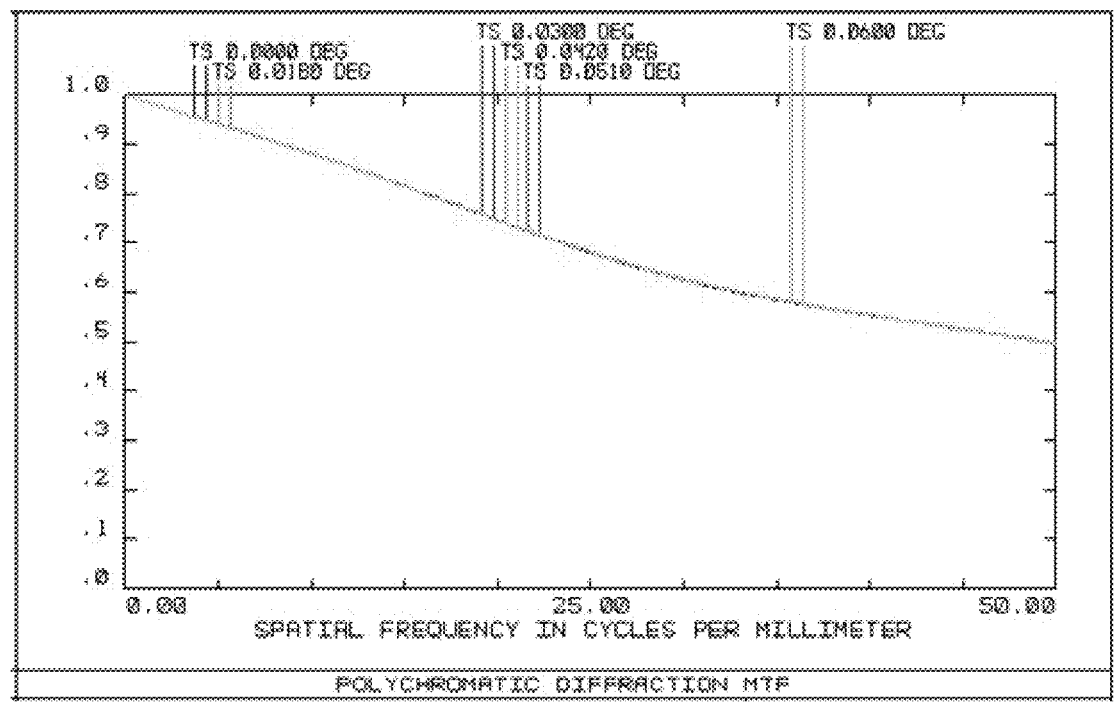
FIG. 3 is a graph illustrating an MTF characteristic of the ultraviolet laser zoom beam expanding system according to an embodiment of the present invention.
Figure 4:
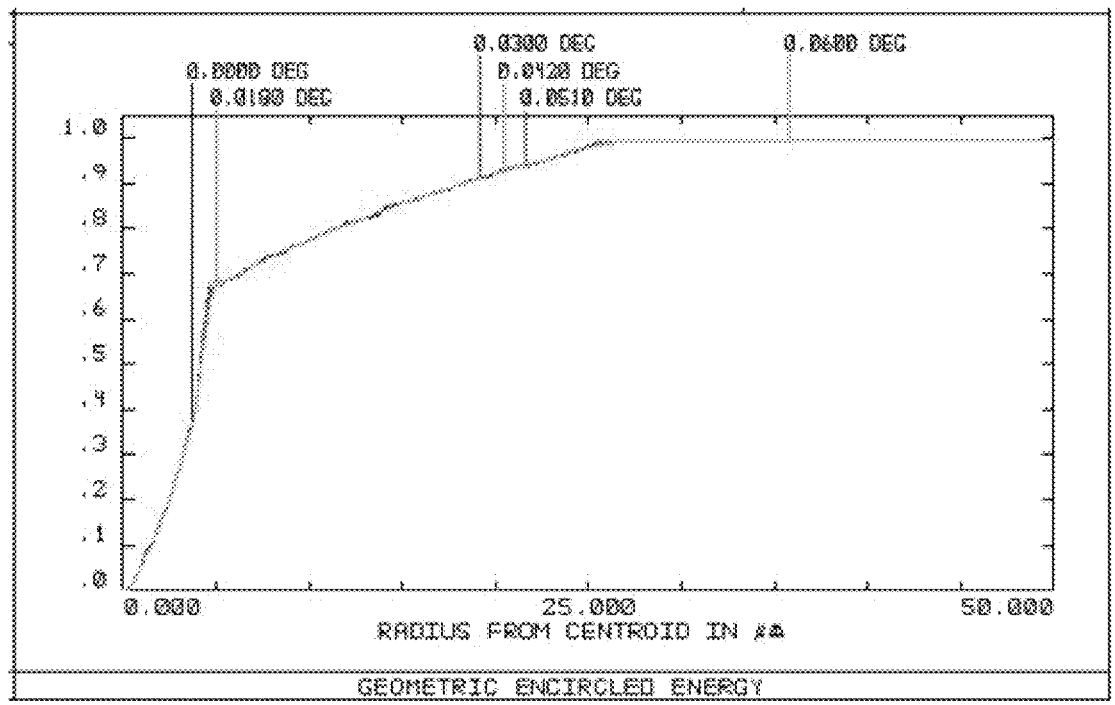
FIG. 4 is a graph illustrating an energy concentration of the ultraviolet laser zoom beam expanding system according to an embodiment of the present invention.

FIG. 2, FIG. 3 and FIG. 4 respectively show a spot diagram, an MTF characteristic and an energy concentration of the ultraviolet laser zoom beam expanding system. It can be inferred from the above drawings that, the emergent light expanded by the zoom beam expanding system has a better focusing capability (a disc of confusion thereof is regular and a confusion range is small, and the energy concentration is relatively high, ensuring a high efficiency and precision of laser processing Preferably, the radiuses of curvature, the ratios of the refractive index to Abbe number, the center thicknesses, the outer diameters of the first, the second, and the third lens can be selected from above provided specific parameters, i.e. the radius of curvature of the first curved surface S1 is ∞, the radius of curvature of the second curved surface S12 is −30 mm, the center thickness d1 is 2 mm, the outer diameter D1 is 10 mm, the ratio of the refractive index Nd1 to Abbe number Vd1 of the first lens L1 is 1.57:41. The second lens L2 and the third Lens L3 are configured in the similar way. The preferred solution can process a better magnification effect, and is specifically adapted to an ultraviolet light with wavelength of 355 nm.

Further, on basis of the key solution or preferred solution, the distance d2 on an optical axis between the second surface S2 and the third surface S3, and the distance d4 on an optical axis between the fourth surface S4 and the fifth surface S5 can be constructed differently, to obtain different beam magnifications β. Several specific preferred solutions are provided as follows.

As a first preferred solution, the distance d2 on an optical axis between the second surface S2 and the third surface S3 is set as 36.9 mm, the distance d4 on an optical axis between the fourth surface S4 and the fifth surface S5 is set as 114.3 mm, certainly, such parameters are preferred parameters, similarly, the tolerances of the distances are 5%. At the time, the beam magnification β of the system is 2.

As a second preferred solution, the distance d2 on an optical axis between the second surface S2 and the third surface S3 is set as 32.6 mm, the distance d4 on an optical axis between the fourth surface S4 and the fifth surface S5 is set as 118.8 mm, tolerances of the distances are 5%, the beam magnification β of the system is 4.

As a third preferred solution, the distance d2 on an optical axis between the second surface S2 and the third surface S3 is set as 27.8 mm, the distance d4 on an optical axis between the fourth surface S4 and the fifth surface S5 is set as 120 mm, tolerances of the distances are 5%, the beam magnification β of the system is 6.

As a fourth preferred solution, the distance d2 on an optical axis between the second surface S2 and the third surface S3 is set as 23.3 mm, the distance d4 on an optical axis between the fourth surface S4 and the fifth surface S5 is set as 120.5 mm, tolerances of the distances are 5%, the beam magnification β of the system is 8.

As a fifth preferred solution, the distance d2 on an optical axis between the second surface S2 and the third surface S3 is set as 19.6 mm, the distance d4 on an optical axis between the fourth surface S4 and the fifth surface S5 is set as 120.8 mm, tolerances of the distances are 5%, the beam magnification β of the system is 10.

As a sixth preferred solution, the distance d2 on an optical axis between the second surface S2 and the third surface S3 is set as 14.4 mm, the distance d4 on an optical axis between the fourth surface S4 and the fifth surface S5 is set as 121.1 mm, tolerances of the distances are 5%, the beam magnification β of the system is 12.

As an seventh preferred solution, the distance d2 on an optical axis between the second surface S2 and the third surface S3 is set as 9.8 mm, the distance d4 on an optical axis between the fourth surface S4 and the fifth surface S5 is set as 121.3 mm, tolerances of the distances are 5%, the beam magnification β of the system is 14.

As an eighth preferred solution, the distance d2 on an optical axis between the second surface S2 and the third surface S3 can be set as 6 mm, the distance d4 on an optical axis between the fourth surface S4 and the fifth surface S5 is set as 121.4 mm, tolerances of the distances are 5%, the beam magnification β of the system is 16.

Above solution will be illustrated more clearly with the following table:

Table 2, comparison table of distance between curved surfaces of the lens, and beam magnifications.

TABLE 2 comparison table of distance between curved surfaces of the lens, and beam magnifications.

| d2 (mm) | d4 (mm) | β |
| --- | --- | --- |
| 36.9 | 114.3 | 2 |
| 32.6 | 118.8 | 4 |
| 27.8 | 120 | 6 |
| 23.3 | 120.5 | 8 |
| 19.6 | 120.8 | 10 |
| 14.4 | 121.1 | 12 |
| 9.8 | 121.3 | 14 |
| 6 | 121.4 | 16 |

According to above described preferred solutions, a magnification effect by 2-16 times can be obtained. In a laser marking process, distances between the three lens can be adjusted according to an exit pupil diameter and a divergence angle of the actual laser, and specific conditions of the focus lens, i.e. the distances between curved surfaces d2 and d4 are adjusted, so as to perform an appropriate beam expanding procedure to the laser beam, thereby enabling the expanded laser beam to meet a processing precision requirement of a laser processing, and to match different laser processing focus lenses to achieve an ideal coupling, and such that a laser processing precision and a processing quality are improved.

The present invention provides an ultraviolet laser zoom beam expanding system which can achieve a beam magnification by 2 to 16 times, the magnification range thereof is far beyond that of a conventional beam expander. The ultraviolet laser zoom beam expanding system can significantly improves a laser processing precision and a processing quality, and has a wider application range, and is suited to be adopted by a variety of ultraviolet laser processing devices, acting as an expanding system of the device to expand the light beam emitted by the laser, then the expanded light beam is focused by a focus lens to a workpiece to be processed.

Since the expanding system has a greater magnification range and is highly adaptive, causing a laser processing equipment adopting the expanding system to have an improved processing precision and a higher processing efficiency.

Although the present invention has been described with reference to the embodiments thereof and the best modes for carrying out the present invention, it is apparent to those skilled in the art that a variety of modifications and changes may be made without departing from the scope of the present invention, which is intended to be defined by the appended claims.

What is claimed is:

1. An ultraviolet laser zoom beam expanding system, comprising a first lens, a second lens, and a third lens, which are coaxially arranged along a transmission direction of an incident light in subsequence; the first lens and the third lens being plane-convex positive lenses, and the second lens being a meniscus negative lens;

wherein the first lens comprises a first surface and a second surface; the second lens comprises a third surface and a fourth surface; the third lens comprises a fifth surface and the sixth surface;

the first to sixth surfaces are arranged sequentially along the transmission direction of the incident light;

radiuses of curvature of the first to sixth surfaces are $\infty$, −30 mm, 10 mm, 2.2 mm, $\infty$, −81 mm, respectively;

center thicknesses of the first to third lenses are 2 mm, 1 mm, 4 mm, respectively;

outer diameters of the first to third lenses are 10 mm, 3 mm, 34 mm; respectively;

ratios of refractive index to Abbe number of the first to third lenses are 1.57:41, 1.48:68, 1.57:41, respectively;

a distance on an optical axis between the second surface and the third surface ranges from 6 to 37 mm; a distance on the optical axis between the fourth surface and the fifth surface ranges from 114 to 125 mm;

tolerances of the radius of curvature, the center thickness, the outer diameter, the ratio of the refractive index to Abbe number, and the distance are 5%.

2. The ultraviolet laser zoom beam expanding system according to claim 1, wherein the distance on the optical axis between the second surface and the third surface is 36.9 mm; the distance on the optical axis between the fourth surface and the fifth surface is 114.3 mm.

3. The ultraviolet laser zoom beam expanding system according to claim 1, wherein the distance on the optical axis between the second surface and the third surface is 32.6 mm; the distance on the optical axis between the fourth surface and the fifth surface is 118.8 mm.

4. The ultraviolet laser zoom beam expanding system according to claim 1, wherein the distance on the optical axis between the second surface and the third surface is 27.8 mm; the distance on the optical axis between the fourth surface and the fifth surface is 120 mm.

5. The ultraviolet laser zoom beam expanding system according to claim 1, wherein the distance on the optical axis between the second surface and the third surface is 32.6 mm; the distance on the optical axis between the fourth surface and the fifth surface is 118.8 mm.

6. The ultraviolet laser zoom beam expanding system according to claim 1, wherein the distance on the optical axis between the second surface and the third surface is 19.6 mm; the distance on the optical axis between the fourth surface and the fifth surface is 120.8 mm.

7. The ultraviolet laser zoom beam expanding system according to claim 1, wherein the distance on the optical axis between the second surface and the third surface is 14.4 mm; the distance on the optical axis between the fourth surface and the fifth surface is 121.1 mm.

8. The ultraviolet laser zoom beam expanding system according to claim 1, wherein the distance on the optical axis between the second surface and the third surface is 9.8 mm; the distance on the optical axis between the fourth surface and the fifth surface is 121.3 mm.

9. The ultraviolet laser zoom beam expanding system according to claim 1, wherein the distance on the optical axis between the second surface and the third surface is 6 mm; the distance on the optical axis between the fourth surface and the fifth surface is 121.4 mm.

10. A laser processing equipment, comprising an ultraviolet laser, an expanding system configured to expand a laser beam emitted by the ultraviolet laser, and a focusing lens configured to focus the expanded beam, wherein the expanding system is the ultraviolet laser zoom beam expanding system according to claim 1.

* * * * *